July 19, 1960
C. O. PETTY
2,945,889
REGENERATION OF SPENT CAUSTIC
Original Filed Dec. 21, 1955
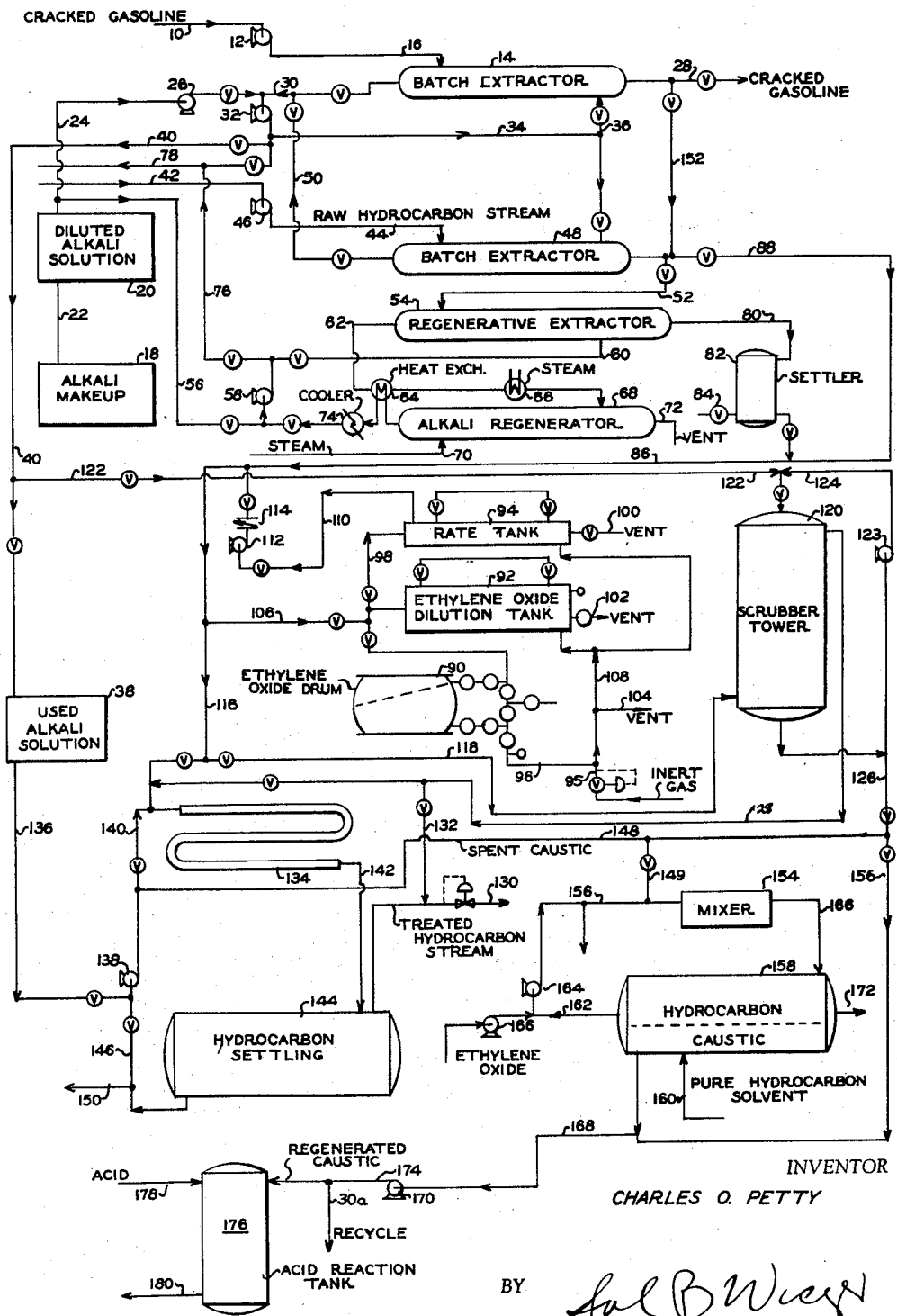
INVENTOR
CHARLES O. PETTY
BY
ATTORNEY

United States Patent Office 2,945,889
Patented July 19, 1960

2,945,889

REGENERATION OF SPENT CAUSTIC

Charles O. Petty, Tyler, Tex., assignor to La Gloria Oil and Gas Company, Tyler, Tex., a corporation of Delaware Original application Dec. 21, 1955, Ser. No. 565,289, now Patent No. 2,862,804, dated Dec. 2, 1958. Divided and this application Oct. 29, 1957, Ser. No. 693,505

4 Claims. (Cl. 260—609)

This invention broadly relates to regeneration of spent caustic solution containing both alkali phenolate and thiol to remove thiol.

According to this invention I have discovered that phenol in substantial concentration, substantially greater than the thiol content and usually exceeding about 5 volume percent, preferably in aqueous alkali solution, catalyzes the reaction between epoxide and organo thiol (mercaptan). Notwithstanding epoxides are known to react readily with phenols, I have found that the epoxide will selectively and preferentially react with organo thiols in the presence of a greater quantity of phenols and even when the thiols are present in very small or trace quantities. The selective thiol reaction takes place rapidly and to such a degree that the organo thiols are reacted with epoxide substantially quantitatively in the presence of the phenol. Moreover, while the catalytic effect of the phenol preferably in caustic solution causes the alkali soluble thiols to react immediately, even alkali insoluble mercaptans are catalyzed to react so that intimately contacted liquid hydrocarbon containing residual alkali insoluble mercaptan may be sweetened when contacted with the alkali phenolic solution for a period sufficient to provide such intimate contact. The reaction product of the thiol and the epoxide such as alkylene oxide is a valuable product soluble in liquid hydrocarbon and exerts a substantial stabilizing effect upon cracked gasolines as an anti-oxidant.

Accordingly, in one useful application of this reaction, impure phenol mixtures such as are commercially available, as by extraction by hydrocarbon oils containing thiols, such as thiocresol, and lower aliphatic mercaptan, may be purified to remove such sulfur compounds substantially quantitatively by reaction with an epoxide, typically alkylene oxide, preferably ethylene oxide or propylene oxide. The reaction apparently is so strongly catalyzed by the phenol and goes so nearly to completion that little more than stoichiometric quantities of epoxide with respect to thiol need be used. However, since the reaction product is soluble in hydrocarbon, a solution of epoxide in liquid hydrocarbon in any concentration may be used to purify the phenol solution.

Such reaction is outstandingly useful in an improved sweetening process for sour hydrocarbon oils such as gasoline, and for this purpose only minute quantities of epoxide would be normally used. Thus spent caustic obtained by alkali washing of sour gasoline to form a spent caustic solution containing alkali phenolate and thiolate may be reacted with a partially sweetened liquid hydrocarbon to which has been added sufficient epoxide such as ethylene oxide to react substantially quantitatively with any residual mercaptan therein as well as with some of the mercaptide in the spent caustic solution. One effect of such reaction is to catalyze the reaction of all the alkali insoluble mercaptan in the liquid hydrocarbon to an epoxide derivative thereof and also form more epoxide derivative of some of the mercaptide present in the spent caustic. This treatment further forms a solution of the epoxide-thiol derivative in small quantity in the gasoline to stabilize the same. Thus by that procedure the gasoline is stabilized, and completely sweetened, using only minute quantities of epoxide therefor. The reaction by catalysis of the alkali phenol solution is so highly efficient that the sweetening and stabilizing is relatively inexpensive and far more economical than any heretofore proposed use of epoxide in gasoline sweetening.

Moreover, the ultimate removal of contaminating thiols from the alkali phenolate solution by continued contact with epoxide solution in liquid hydrocarbon regenerates the same, so that phenols, a valuable commercial product, may now be recovered by neutralization of the alkali with acid as phenol relatively free of contaminating thiol compounds. However, such thiol free alkali phenolate regenerated in this procedure may also be used if desired in extracting further quantities of alkali soluble thiols from raw sour liquid hydrocarbon.

In the prior art it was suggested that higher epoxides in the presence of oil soluble catalyst react with free hydrogen sulfide and inhibits hydrogen sulfide odor in lubricating oils containing sulfurized additives (Baker 2,684,943). It was further suggested that as little as 0.05 weight percent of ethylene oxide in gasoline could be added to an alkali washed sour gasoline to effect sweeting thereof, but that preferred practice was to use 0.2 to 0.8 weight percent of ethylene oxide for a sweetening effect which was commercially useful (Arundale et al. 2,575,989).

The term epoxide as used herein means a compound containing an olefine oxide group having the following structure:

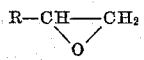

R may be hydrogen or any organic, preferably hydrocarbon radical, aliphatic, cyclo aliphatic, or aromatic carbocyclic, but for purposes of sweetening sour liquid hydrocarbon it is preferred to use lower alkylene oxides wherein R is a 1 or 2 carbon atom alkyl, or hydrogen, because these are more easily handled, and react more rapidly and efficiently. Useful higher epoxides usually for purposes other than sweetening include amylene oxide, cyclohexene oxide, styrene oxide, epichlorohydrin, glycide, and decene oxide.

According to the present procedure using spent caustic containing extracted acid oils as catalyst for sweetening, it is found that far less than the minimum proposed in the art of 0.05 weight percent of ethylene oxide may be used for far more effective sweetening. In fact as little as 0.001 weight percent by the present procedure, and preferably from 0.001 to 0.04 weight percent of alkylene oxide based on the sour liquid hydrocarbon, will reduce the mercaptan content to much less than the quantity of residual mercaptan resulting from prior art sweetening methods. In practical application, the alkylene oxide will be used in slightly above, up to 150%, of the stoichiometric mercaptan content of the sour gasoline whereby a quantity greatly less than the minimum considered possible in the art will effect the far more highly efficient sweetening.

Thus, applicant's process applied to the sweetening of liquid hydrocarbons preferably comprises removing lower alkali soluble acid components from sour gasoline by a caustic soda wash to produce a spent caustic containing substantial quantities, at least 5 and up to 60 volume percent, of acid oils comprising alkali phenolate, mostly sodium cresylate, alkali mercaptides such as sodium thiocresylate, lower alkali soluble aliphatic mercaptides and some other acidic impurities such as naphthenic acids, as their alkali salts. The spent caustic will usually contain between 10 and 50 volume percent of such acid oils. In sweetening, a sour liquid hydrocarbon such as gasoline stock is first washed with caustic soda solution in water to remove the alkali soluble acid oils. A partially sweetened gasoline by alkali wash then has added thereto a minute quantity of alkylene oxide, usually ethylene or propylene oxide, in quantity less than about 0.05 weight percent, and as a practical matter, the quantity of alkylene oxide added is preferably adjusted on the basis of the residual alkali insoluble mercaptan content of the partially sweetened liquid hydrocarbon, and this may be 1.1 to 3 equivalents thereof, thus desirably providing a slight excess serving only to reduce the reaction time at any given temperature and reduce by reaction some of the thiol content of the spent caustic. It will be understood that any alkylene oxide content within this range would operate to radically reduce the mercaptan content to substantial nullity under the strong catalysis of the spent caustic rich in alkali phenolates, and the quantity of alkylene oxide accordingly need only slightly exceed that needed for stoichiometric reaction with residual mercaptan.

The time, temperature and pressure and flow rates for reaction will be regulated primarily by economy in handling and the characteristics of the materials. Thus the temperature used is dictated largely by the boiling point range of the liquid hydrocarbon to be sweetened. The higher temperature is used for hydrocarbon liquids of higher end point, which might contain less readily reactable and heavier residual mercaptan. For example, the broadest range of reaction temperatures for sweetening a liquid hydrocarbon will generally be from about 50 to 200° F., but the the temperature is preferably held to a narrower range depending upon the liquid hydrocarbon to be sweetened. For liquified gases and natural gasolines a useful temperature of sweetening treatment is between 50 and 85° F.; for wide BP range gasolines 75 to 120° F.; for naphthas 85 to 135° F.; for kerosene 95 to 140° F.; and for diesel and furnace oils 105 to 150° F.

The alkali washed partially sweetened liquid hydrocarbon containing a proper quantity of alkylene oxide is mixed by agitation with the spent caustic and held at the selected temperature for a period of 1 to 45 minutes, usually about 3 to 30 minutes, the greater reaction time giving the more complete reaction.

The reaction may take place at atmospheric pressure at a reasonable rate, but for purposes of readily handling liquids under pumping flow for commercial operation and to slightly increase the time of reaction by improving the intimacy of the mixture of reagents, slightly raised pressures are preferred in a sweetening system, such for example as 10 to 100 lbs. p.s.i. gauge. At the upper portion of the temperature and pressure ranges given, the reaction period needed is less and usually 3 to 15 minutes will suffice for very efficient sweetening.

Preliminary caustic wash of the liquid hydrocarbon is with caustic solutions of 5 to 50%, preferably 20 to 45%, by weight of sodium hydroxide in water. The hydrocarbon stream may be scrubbed with 5 to 135% by volume of this caustic wash, preferably 20 to 50% by volume. For continuous flow, 100 barrels per hour of liquid hydrocarbon may be scrubbed with 5 to 135 barrels per hour of caustic solution, preferably 25 to 100 barrels per hour.

To illustrate the practical operation of this process for sweetening of gasoline, reference is made to the attached diagrammatic flow sheet. Hydrocarbon fluid such as sour gasoline containing mercaptans, phenols, etc., enters the system through line 10 impelled by pump 12 which may build up pressure to whatever the system is operating at such as 10 to 100 p.s.i., and passed to a batch extractor 14 by way of line 16. Caustic soda, such as 50° Bé. or even higher sodium hydroxide solution in water, is made up in a supply tank 18 and passed to a dilution tank 20 by way of line 22 where it is diluted to desired concentration of 5 to 50 weight percent usually 20 to 45 weight percent, and thence pumped through line 24 by pump 26 into the batch extractor or scrubber 14. The scrubbed gasoline leaves the extractor 14 through line 28 usually passing to storage. This alkali washed gasoline may be of a character that needs no further sweetening treatment, but if further sweetening is needed it may be the starting material for further desulfurization. For example, a fluid catalytically cracked naphtha boiling in a range of 340 to 460° F. containing 0.004 weight percent of mercaptans, mostly thiocresols, and 0.25 weight percent of phenols, mostly cresols, scrubbed with a 50% caustic solution is usually sufficiently sweetened for use without further treatment with ethylene oxide. The caustic solution is recycled from line 30 by pump 32 and lines 34 and 36 through the batch extractor with succeeding batches of gasoline until the acid oil content has been built up in the caustic solution to more than about 5 volume percent and usually 10 to 50 volume percent. The caustic solution may also be circulated in contact with other sour hydrocarbon before it is "spent." Thereafter, the spent caustic is sent to used alkali solution storage 38 by way of line 30, pump 32, and line 40.

For sweetening with ethylene oxide for example, according to the present sweetening method, raw hydrocarbon containing mercaptan in quantity and character which is not satisfactorily sweetened by simple caustic wash, such as wide range cracked gasoline or other hydrocarbon liquid as mentioned above, is drawn into the system by pump 46 through lines 42 and 44 and sent to batch extractor 48. That batch extractor 48 allows the gasoline to be scrubbed by caustic solution also supplied from tank 20 by way of pumps 26 and 32, lines 24, 34 and 36; and as shown the caustic may be the same solution that is circulated through batch extractor 14 recycling through lines 50 and 36 taking some flow from line 34 and impelled by pump 32.

The alkali washed gasoline before further treatment may be again washed with caustic to further reduce the sulfur content, but since practically all of the alkali extractible acid oils have already been substantially withdrawn, any further alkali wash may be modified, using a regenerative type extractor. For this purpose the alkali washed gasoline will be passed through line 52 to regenerative extractor 54 for extractive contact with alkali. This alkali is also taken from dilute alkali storage tank 20 by way of line 56 and pump 58 and sent to the regenerative extractor by way of line 60. After extraction of some additional mercaptan, the caustic is withdrawn through line 62, preheated through heat exchanger 64 and heated to the boiling point by steam coil 66 before entering the alkali solution regenerator 68, wherein live steam is passed from line 70 to effect removal of mercaptans therefrom by volatilizing them through vent 72 and regenerating the alkali. The regenerated alkali after passing through heat exchanger 64 is further cooled in cooler 74 and recycled by pump 58 to line 60 for re-use. The spent caustic after a time may be withdrawn from the system through line 76 for disposal through line 78. The twice alkali scrubbed gasoline after leaving the regenerative extractor through line 80 is passed to a settler 82 to remove any entrained alkali which is withdrawn through outlet 84. Alkali free gasoline is then passed for further sweetening treatment in the system to line 86.

The regenerative extractor scrubbing may be dispensed with and only a single wash performed in 48 may be applied to the gasoline in which event the regenerative extractor will be by-passed from batch extractor 48 passing through line 88 and thence to line 86 for further treatment.

The further sweetening treatment of gasoline passing through line 86 usually consists of first adding the controlled quantity of ethylene oxide, less than about 0.05% preferably in only slight excess of the residual mercaptan content in the gasoline passing through line 86. For this purpose, ethylene oxide is supplied from a drum 90 to a dilution tank 92 wherein a concentrated solution of ethylene oxide is formed in gasoline. That stock solution is used for more ready distribution, admixture with the gasoline to be sweetened, and for most accurate control of the quantity of ethylene oxide supplied. For the latter purpose, the solution of ethylene oxide is distributed from a rate tank 94. For preparing the alkylene oxide supply system for use, inert gas such as methane or nitrogen is first passed into the dilution and rate tanks from any suitable source by way of lines 95, 96 and 98 to purge all air from the ethylene oxide system, expelling the same through vents 100, 102 and 104 to free these tanks and lines from air. Thereafter, the vents are closed and the system pressurized to the same pressure as the gasoline passing in line 86. Diluent hydrocarbon liquid is then passed into the dilution tank 92 through line 106 to desired level. Thereafter inert gas is passed into line 96 under pressure to expel ethylene oxide from drum 90 into the dilution tank 92 to desired concentration as a concentrated solution of ethylene oxide in hydrocarbon, to substantial but known concentration of from 1 to 100 volume percent, usually 10 to 40 volume percent. Thereafter, the concentrated ethylene oxide solution in hydrocarbon is expelled by inert gas passed through line 108 from the dilution tank by way of line 98 into the rate tank. The concentrated stock solution of ethylene oxide in hydrocarbon liquid under pressure of inert gas in line 108 is then pumped by way of line 110 and pump 112 through valve 114 which passes the solution at a controlled rate and accurately controls the quantity admixed with the gasoline passing in line 86.

This method of adding the ethylene oxide to the gasoline to be sweetened by first forming a stock solution makes the volumetric measurement of the solution of known ethylene oxide content to the gasoline to be sweetened more accurate. Moreover, it allows the ethylene oxide to be pumped as a liquid and further reduces the danger of ethylene oxide from polymerizing with itself as it often tends to do when handled in high concentration.

The sour gasoline containing ethylene oxide is now contacted with spent caustic solution containing acid oils. It may be passed through line 116 to a scrubber 120 by way of line 118 and scrubbed with the spent alkali containing acid oils passed countercurrently through the scrubber tower 120. The spent caustic is obtained from line 40 sent to the scrubber by way of line 122, the used alkali solution being circulated countercurrently recycling with pump 123 by way of line 124 to the top of the scrubbing tower from the bottom until the mercaptan content of the spent alkali solution is exhausted. The mercaptan-free caustic is then sent to a phenol recovery system through lines 126, 156, 168 and 174, or alternatively recycled from line 30a which connects with 30 (not shown) for further use as a caustic wash liquid. The simple scrubbing of the gasoline containing ethylene oxide with used alkali solution containing phenol in scrubber 120 markedly reduces the mercaptan content to a usefully sweet gasoline and that gasoline may be withdrawn from the top of the scrubber tower 120 through line 128 and from the system as treated hydrocarbon for any further treatment that may be desired through line 130 by way of line 132.

However, far more efficient mercaptan removal is possible by passing the sour gasoline containing ethylene oxide in line 116 to a reaction mixer 134 together with used alkali solution which will be pumped by pump 138 from the used alkali storage tank 38 by way of lines 136 and 140, joining the gasoline containing ethylene oxide in line 116 as it enters the mixers 134. Thus the three materials, sour gasoline, ethylene oxide, and spent caustic solution containing at least 5 and up to 60 volume percent of acid oils extracted from sour gasoline are intimately agitated or brought in intimate contact in the mixers for a period of 1 to 45 minutes and held at a temperature during this period as given above, depending upon the type of hydrocarbon fluid being treated. From the mixer, the now sweetened gasoline passes through line 142 to a settling tank 144 and removed therefrom as treated gasoline through line 139. The partially regenerated caustic soda solution settled at the bottom of tank 144 is withdrawn through line 146 and recycled to the mixer by pump 138. After the mercaptan content of the spent caustic has been removed by reaction with excess of ethylene oxide contained in the gasoline, the spent caustic solution now containing only phenols and other oxygenated compounds such as naphthenic acids may be pumped by pump 133 to phenol recovery line 126 by way of lines 148, 156, 168 and 174, or the mercaptan-free spent caustic containing phenol may be withdrawn from line 146 through line 150 and recycled for further caustic wash of sour gasoline (not shown) to line 30. If desired the sweetened gasoline in line 128 may be again contacted with spent caustic from line 140, both being passed into mixers 134.

Surprisingly great advantages are present by using spent caustic solution as a catalyst for improved sweetening of the sour gasoline. For instance, simple washing of sour cracked gasoline with about 20% caustic soda can reduce the mercaptan content by about 80% and higher caustic content with repeated washing can sometimes remove up to 90% but not more, and most gasolines are inadequately sweetened thereby. Moreover, even simple contact of sour gasolines with ethylene oxide and alkali as suggested in the art gives inadequate sweetening unless large quantities of ethylene oxide are used. For example, a gasoline having a content of 0.01 weight percent of mercaptan to which 0.05 weight percent of ethylene oxide is added and contacted for 10 minutes with 20% caustic solution had its mercaptan sulfur reduced to 0.0025 weight percent. To this same gasoline mixture spent caustic in the same concentration but containing 15 volume percent of acid oils was now added and shaken for 3 more minutes and the mercaptan sulfur was then found to be reduced to 0.00006 weight percent, thereby indicating that the spent caustic reduces the sulfur content to about $\frac{1}{50}$ that resulting from ordinary caustic treatment with the same minimum quantity of ethylene oxide contacted for a period of only 3 minutes. It is apparent that in the presence of this highly activating phenolic spent caustic solution the quantity of alkylene oxide needed to reduce the mercaptan even to a far greater degree, may be greatly reduced below the minimum quantity of alkylene oxide considered to be useful in the art.

The following table illustrates the effects of the present method compared with that of the prior art caustic washes with and without ethylene oxide, as a series of spot tests under laboratory conditions.

TABLE I

[Thermally cracked gasoline—sweetened with ethylene oxide (laboratory tests)—Gasoline properties—Copper No., 19; Bromine No. 67.0; Sp. gravity, .755; B.P., 80–435° F.]

| Test No. | Treatment | Copper No. of Product |
|---|---|---|
| 1 | Washed twice with 10 vol. percent, 16 wt. percent, caustic at 80° F. | 5 |
| 2 | Washed with 10 vol. percent, 30 wt. percent, caustic at 80° F. | 4 |
| 3 | Washed with 10 vol. percent, 30 wt. percent, caustic containing 24 vol. percent Alkyl Phenols and Thiophenols (Phenols and Thiophenols extracted from a catalytically cracked naphtha boiling between 340–450° F.) at 80° F. | 1.5 |
| 4 | Washed with 10 vol. percent, 20 wt. percent, caustic+0.032 percent Ethylene Oxide at 80° F. | 3.5 |
| 4a | Washed with 10 vol. percent 30 wt. percent caustic+0.32 percent Ethylene Oxide at 80° F. | 1.3 |
| 5 | Washed with 10 vol. percent, 30 wt. percent caustic containing 24 vol. percent Alkyl Phenols and Thiophenols+0.32 percent Ethylene Oxide at 80° F. | 0 |
| 6 | Washed with 10 vol. percent, 30 wt. percent caustic containing 24 percent Alkyl Phenols and Thiophenols+0.032 percent Ethylene Oxide at 80° F. | 0.75 |
| 7 | Washed with 10 vol. percent, 30 wt. percent, caustic containing 24 vol. percent Alkyl Phenols and Thiophenols+0.064 percent Ethylene Oxide at 80° F. | 0.65 |
| 8 | Washed with 10 vol. percent, 30 wt. percent, caustic containing 24 vol. percent Alkyl Phenols and Thiophenols+0.096 percent Ethylene Oxide at 80° F. | 0.50 |
| 9 | Washed with 10 vol. percent, 30 wt. percent, caustic containing 24 vol. percent Alkyl Phenols and Thiophenols+0.16 percent Ethylene Oxide at 80° F. | 0.23 |
| 10 | First washed with caustic as in #2, then washed with 10 vol. percent 30 wt. percent caustic containing 24% Alkyl Phenol and Thiophenol+0.008 wt. percent Ethylene Oxide at 80° F. | 0.60 |
| 11 | Same as #10+0.016 wt. percent Ethylene Oxide | 0.20 |
| 12 | Same as #10+0.032 wt. percent Ethylene Oxide | 0 |

The data shows that washing with ordinary caustic at 80° F. reduces a 19 Copper No. gasoline to about 5 with two caustic washes and to 4 with a single washing of more concentrated caustic. The presence of alkyl phenols and thiophenols in a 30 percent caustic wash in test No. 3 still further reduced that Copper No. to 1.5, even in the absence of ethylene oxide. The Copper No. 3.5 obtained in test No. 4 does not reflect substantial reduction by ethylene oxide by using .032% in the presence of ordinary caustic; compare test No. 2 with test No. 4. A much larger quantity (.32%) of ethylene oxide, in the presence of spent caustic containing acid oils reduced the Copper No. to zero in test No. 5. Tests 6 through 9 indicate that Copper Nos. below 1 are also possible when using greatly reduced quantities of ethylene oxide ranging from ½ to 1/10 the quantity of ethylene oxide used in test No. 5. For instance, further comparing test No. 4 with test No. 6, wherein the same quantity of ethylene oxide was used, the presence of alkyl phenols caused notably greater reduction of Copper No. from 3.5 to 0.75. Test No. 4a illustrates that much larger quantities of ethylene oxide do improve the sweetening over test No. 4, but do not approach the results available in No. 5 wherein the same quantity of ethylene oxide is used in the preesnce of a phenolic catalyst. As illustrated in tests 6 through 9 while the sulfur content in each case is very low, there is some variation thereof with the concentration of ethylene oxide in these short spot washing tests. In contrast, tests 10, 11 and 12 using the same respective quantities of ethylene oxide gives steadily improved results when the gasoline is first washed with ordinary caustic in a preliminary wash.

It will be apparent in practical figures of economy that the present process using spent caustic to catalyze the reaction allows sweetening of gasoline at a cost which is a mere fraction of that needed by known sweetening methods using alkylene oxide. By the present procedure it becomes possible to use extremely minute quantities, substantially less than the minimum regarded as necessary by the prior art, such as 0.05 wt. percent of ethylene oxide. The present method therefore allowing such decreased necessary use of ethylene oxide becomes highly economical.

For example, to illustrate this point, the Arundale process referred to above as prior art preferably uses from 0.2 to 0.8 weight percent of ethylene oxide, whereas, in contrast the present process may use less than the minimum quantity considered by Arundale to possibly operate. Thus referring to Arundale's table, operation Nos. 12, 24 and 56, it required from 0.4 to 0.6 weight percent of ethylene oxide to reduce a 20 Copper No. gasoline to a Copper No. of 1. That quantity assuming 0.5 weight percent of ethylene oxide would cost 49 cents per barrel for sweetening. In contrast merely on an experimental basis comparable to that shown by Arundale, it would cost 3.0 cents per barrel using phenolic spent caustic as a catalyst, the quantity of ethylene oxide being 0.032 weight percent as shown in test No. 6 above.

Of course, larger quantities of ethylene oxide will operate to reduce mercaptan in applicant's method using spent phenolic caustic to catalyze the sweetening with some but lesser loss of economy than by other procedures because the reaction will run faster at lower temperatures and with more efficient sweetening than available by such prior art methods. Various manipulative procedures for contacting sour gasoline with alkylene oxide and spent caustic may be applied. It is desirable for purposes of economy that the sour gasoline be first washed with caustic to remove alkali soluble phenol and mercaptan, because this reduces the quantity of residual mercaptan in the liquid hydrocarbon to be sweetened and thereby reduces the quantity of alkylene oxide necessarily required. Consequently, in actual plant operation on thermally cracked gasoline, the commercial cost will reduce to 2.0 cents per barrel to obtain a Copper No. of less than 1.0.

This point is illustrated by reference to test No. 6 in applicant's table above. For instance, in a spot laboratory test using 0.032 weight percent ethylene oxide without preliminary caustic wash, a Copper No. of 0.75 was obtained (0.001 weight percent of mercaptan sulfur). If the same gasoline is first given a preliminary caustic wash according to applicant's preferred procedure the original mercaptan content of the gasoline, 0.026 weight percent is reduced by the preliminary wash to 0.010 weight percent of residual mercaptan sulfur in the gasoline. This would require only 0.013 weight percent of ethylene oxide to reduce the mercaptan sulfur content to the same 0.75 Copper No. (0.001 weight percent), thus indicating that the necessary quantity of alkylene oxide may be reduced to about ⅓ of that necessary where a preliminary caustic wash is applied.

Moreover, that preliminary caustic wash while removing alkali soluble acid oils serves to make available the spent caustic used to catalyze the alkylene oxide sweetening. However, that preliminary caustic wash may be omitted, with sacrifice of some substantial economy inherent in the method, if desired.

The alkylene oxide preferentially reacts with the mercaptans, both alkali soluble aliphatic mercaptans and thiophenols, in the spent caustic, the phenols and alkyl phenols serving to catalyze that reaction. In the presence of the phenolic concentrate contained in the spent caustic, the alkylene oxide also reacts with higher caustic insoluble mercaptans in the alkali washed gasoline. The mercapto-epoxide reaction product is soluble in the hydrocarbon liquid and the hydrocarbon liquid has substantially improved stability in view of its content of this reaction product. In another phase of this invention the mercapto-epoxide reaction product may be recovered from spent caustic as a concentrate which is useful as a gasoline stabilizer. Purified components of this reaction product may also be recovered and employed as useful products. For example, the concentrate or one of its separated components may be returned to cracked gasoline as a stabilizer therefor to inhibit the same against oxidation in storage. For the purpose of producing a wider variation of products by mercapto-epoxide reaction, various other epoxides such as higher epoxides listed above may be used for reaction with the mercaptan in spent caustic to regenerate the caustic, or to form gasoline stabilizers, or in gasoline in the sweetening and stabilization thereof.

*Example I*

A fluid catalytically cracked naphtha boiling in the range of 340 to 460° F. containing 0.004 weight percent of mercaptans mostly thiocresols and 0.25 weight percent of phenolic compounds mostly cresols was introduced into batch scrubber 14 at a flow rate of 100 barrels per hour. It was scrubbed with a 38 weight percent solution of caustic soda introduced into the scrubber at a rate of 75 barrels per hour, the caustic solution being recycled until the caustic had absorbed 20 volume percent of acid oils and it was then sent to used alkali storage 38 by way of line 40 and replaced with a fresh batch of alkali. The caustic washed cracked gasoline was not further sweetened.

A wide boiling range thermally cracked raw sour gasoline was introduced to batch extractor 48 and washed by circulation of the same caustic soda solution and at the same rate simultaneously with washing of gasoline in batch 14. That raw gasoline initially contained 0.016 weight percent of mercaptan and consisted of a wide range cycle oil from a catalytic cracking unit containing coker distillate and has a boiling point in the range of 80 to 435° F. After leaving batch extractor 48 the mercaptan content had been reduced to 0.010 weight percent. The caustic washed distillate was then sent directly from batch extractor 48, by way of lines 88 and 116 and after having added thereto 0.03 weight percent of ethylene oxide introduced in accurate quantities by way of valve 114 was pumped by way of line 118 to the top of the scrubbing tower 120. The system had been pressurized to 50 lbs. p.s.i. and the distillate was maintained at a temperature of 95° F. It was washed at the same flow rate of 100 barrels per hour countercurrently in scrubber tower 120 with 75 barrels per hour of the 38 weight percent spent caustic containing 20 volume percent of acid oil, also heated to 95° F., from used alkali storage 38 by way of line 122. The mercaptan content of the gasoline leaving the tower in line 128 had been reduced to 0.002 weight percent. The gasoline was then passed to mixers 134 in contact with 75 volume percent of the same used caustic solution but agitated for 10 minutes in mixer 134 and finally passed to the hydrocarbon settling chamber 144 and then out through line 130 as sweetened gasoline. It now contained 0.0006 weight percent of mercaptan thereby indicating that by increasing the time of contact of caustic and acid oil with the gasoline, the mercaptan removal is greater.

*Example II*

The same wide boiling range thermally cracked gasoline of Example I was divided into separate flow portions, each being introduced to lines 10 and 42 respectively so that batch extractors 14 and 48 were operated upon the same raw gasoline and both initially extracted products were recombined by way of line 152 and line 52 and sent to a regenerative extractor 54 which contained fresh 38% caustic. That regenerative extractor had the caustic continuously recycled from extractor 54 through regenerator 68 and the spent caustic was ultimately disposed of through line 78 outside of the system. After settling in settler 82 the doubly extracted raw gasoline stock which then contained 0.01 weight percent of mercaptan was passed through line 86 and had 0.035 weight percent of ethylene oxide dissolved in hydrocarbon solvent accurately added thereto through valve 114. The ethylene oxide containing gasoline was then passed to the mixer 134 through line 116 together with 75 volume percent of 38 weight percent spent caustic solution containing 20% of acid oil and agitated in the mixers 134 for a period of 12 minutes, finally being sent to hydrocarbon settling chamber 144 and out of the system through line 130. The sweet gasoline was found to contain 0.0005 weight percent of mercaptan (0.3 Copper No.) and had been treated at a cost of 2 cents per barrel.

*Example III*

The sweetening as described in Example I was performed upon a fluid catalytically cracked light gasoline boiling between 80–370° F. It contained initially 0.03 weight percent of phenols and 0.003 weight percent of mercaptans. After initial 20% alkali wash it had added thereto 0.005 weight percent of ethylene oxide and was scrubbed in scrubber 120 in contact with a 20 weight percent spent caustic solution containing 12 volume percent of acid oils. It was found that the mercaptan content had been reduced to 0.0002 weight percent at a cost of 0.48 cents per barrel.

It will be noted that in general the higher the percent of caustic and acid oil in the spent caustic solution the better the conversion of mercaptans. The greater the contact time, the better the removal. Temperature has no substantial effect except that it is generally preferred to use somewhat raised temperatures because of the consequent reduction of viscosity of the caustic solution allowing greater quantities to be circulated and thereby higher spent caustic to gasoline ratios which gives more efficient sweetening. The higher the ethylene oxide concentration, the more rapid and complete removal effected. These examples accordingly indicate that very efficient sweetening of gasoline is possible using far less quantity of ethylene oxide than possible by prior art practices.

REGENERATION OF SPENT CAUSTIC

In the Examples I to III given to illustrate sweetening, substantial quantities of mercaptan are withdrawn by reaction of the slight excess of ethylene oxide in the hydrocarbon with the mercaptan in the spent caustic, sufficient to allow the mercaptan content of the spent caustic to be continuously reduced to the end that the caustic may be recirculated for further use as a caustic wash in preliminary washing as in batch extractors 14, 48 or 54. It is possible, however, using the present selective reaction of alkylene oxide on mercaptan in the presence of phenolic acid oil to completely remove the contaminating mercaptan, thereby allowing recovery of both the product of the reaction of alkylene oxide with mercaptan and the purified phenolic oil which is illustrated in the following examples.

*Example IV*

A spent caustic solution containing 40% of caustic soda in water and 52 volume percent of acid oils consisting of a crude mixture of approximately 92% alkyl phenols and phenols, mostly cresols, about 2% of carboxylic acids of the character of naphthenic acid, and about 6% of mercaptans of which about 1½% are lower alkali soluble aliphatic mercaptans and about 4–12% are thiophenols, mostly thiocresols, is passed from spent alkali solution tank 38 to a mixer 154 by way of lines 156, 149 and 148, pump 138 and line 136. It is contacted with a hydrocarbon solvent which may be a relatively pure hydrocarbon such as synthetic isooctane introduced into settling tank 158 through line 160 and drawn from that settling tank 158 through line 162 by pump 164, which passes the hydrocarbon in intimate contact with the spent caustic flowing from line 156, both into the mixer 154. Pump 166 passes ethylene oxide into the hydrocarbon line 162 to form a solution therein in substantial quantity to form a concentrate which will correspond to the strength of the ethylene oxide-mercaptan reaction product to be dissolved in the hydrocarbon as a concentrate. About 10 weight percent of ethylene oxide with respect to the hydrocarbon in tank 158 is introduced by pump 166 together with hydrocarbon from line 162 and caustic from line 148 into mixer 154 by way of line 156. Reaction takes place at ambient temperature and the mixture passes back to the hydrocarbon tank 158 through line 166, wherein the caustic solution, now free of mercaptan, is allowed to settle. The purified caustic is withdrawn as a lower liquid layer through line 168 and pump 170 by which it is either recycled from line 174 to the system as a caustic wash solution through line 30a or to a phenol recovery tank 176. The hydrocarbon in tank 158, which contains an excess of ethylene oxide, is recycled through line 162 and pump 164 to the mixer to react with more spent caustic until it is completely reacted and the concentrated hydrocarbon solution in tank 160 is withdrawn through line 172 for further purification of epoxide-mercaptan reaction product in another system. Such system (not shown) may consist of a rectifier which will remove the hydrocarbon and fractionate the product into select fractions of narrow boiling point range. The purified alkali phenolic solution sent to acid reaction tank 176 has a stoichiometric quantity of neutralizing acid, typically sulfuric acid, added thereto through line 178. The acid phenol solution is withdrawn through line 180 and sent to a rectifier from which phenolic oils are separated by distillation removing first the water and then distilling the phenols into select fractions.

Example V

Crude commercial phenol contaminated with mercapto compounds, mostly thiocresols, obtained as a fraction of phenolic oils condensed from coke oven distillate is purified by dissolving the phenolic oil in a caustic soda solution in water containing only sufficient caustic to render the solution alkaline. The solution is then reacted with ethylene oxide dissolved in petroleum ether by scrubbing in a batch scrubber, allowing the hydrocarbon and aqueous layers to separate by settling, withdrawing the aqueous alkaline phenol layer and finally neutralizing with dilute sulfuric (40° Bé.) acid. A phenol solution originally containing 0.52% sulfur compounds has the sulfur content reduced to 0.00002% sulfur when washed with petroleum ether containing 1.0% by weight of ethylene oxide for 40 minutes.

Example VI

In a further spot laboratory test to illustrate purification of phenols obtained by caustic wash, 100 grams of 25 weight percent of spent caustic solution containing 50 volume percent of phenols extracted from thermally cracked gasoline and 1.0 weight percent of mercaptans was contacted with 3500 ml. of gasoline containing 0.05 weight percent of ethylene oxide for 5 minutes. The contact was by continuous stirring of the mixed solutions. The solutions were then allowed to settle and separate. The aqueous caustic layer was neutralized with 50% sulfuric acid. The neutral aqueous solution was then distilled. The mercaptan content of the phenols was 0%. The total sulfur content was 0.04 weight percent.

Example VII

Thermally cracked gasoline of Example II has added thereto a sufficient quantity of a 10% concentrate of ethylene oxide-mercaptan reaction product in gasoline as formed in Example IV, for forming a 0.5 weight percent of the reaction product in the cracked gasoline. That cracked gasoline, obtained from extractor 14 after caustic wash to remove phenols and sulfur, is unstable and has an induction period in a bomb at 212° F. under 100 lbs. oxygen pressure of 100 minutes. After addition of the reaction product solution, it was found to have an induction period of 2¾ hours, thereby indicating that the reaction product is an efficient stabilizer and anti-oxidant for the readily oxidizable gasoline.

Example VIII

Much smaller quantities of dissolved ethylene oxide-mercaptan reaction product resulting from ordinary sweetening without specific increase of quantity, however, exerts an enhanced stabilizing effect upon ordinary phenolic type inhibitors that may be conventionally added to gasoline for stabilizing the same against gum formation resulting from oxidation of the gasoline in storage. To illustrate this a thermally cracked gasoline is first washed with a 45 weight percent spent caustic soda solution containing 20 volume percent of acid oils. It has a 100 lb. p.s.i. oxygen induction period at 212° F. of 60 minutes and a copper dish gum content of 7 mg. per 100 ml. In contrast, that same gasoline to which 0.05 weight percent of ethylene oxide was added and then washed with the same caustic wash was found to have an induction period of 100 minutes and a copper dish gum of 35 mg. per 100 ml. Thereafter controlled quantities of a standard gum inhibitor was added to each sample of gasoline, the gum inhibitor being ditertiary butyl-paracresol. The following table shows the effect of both treatments with variable quantities of gum inhibitor.

|  | Induction 100 p.s.i. Oxygen and 212° F. | Copper Dish Gum mg./100 ml. | Wt. Percent Ditertiary Butyl-paracresol |
| --- | --- | --- | --- |
| 1. Thermally cracked gasoline sweetened with 45 wt. % caustic containing 20% phenols | 60 | 70 | 0 |
|  | 110 | 30 | 0.002 |
|  | 130 | 18 | 0.004 |
|  | 150 | 15 | 0.006 |
|  | 180 | 10 | 0.008 |
|  | 195 | 8 | 0.012 |
| 2. Thermally cracked gasoline ethylene oxide sweetened | 100 | 35 | 0 |
|  | 160 | 12 | 0.002 |
|  | 200 | 10 | 0.004 |
|  | 260 | 4 | 0.006 |
|  | 300 | 1 | 0.008 |
|  | 310 | 0 | 0.012 |

Example IX

To illustrate isolation of the ethylene oxide-mercapto reaction product useful as a gum inhibitor, a 30 wt. percent caustic solution containing 10% by volume phenols, 3% by wt. mercaptans, and 0.1% by wt. sulfides was contacted with a mixture of 50% commercial benzol and 50% petroleum ether (90–160° F.) containing ethylene oxide. Two thousand ml. of the hydrocarbon containing 0.05 wt. percent ethylene oxide was contacted with 15 grams of the caustic for three minutes. The ethylene oxide concentration was maintained at 0.05 wt. percent and the process repeated until a total of 200 grams of caustic was treated. Analysis of the caustic revealed—0% sulfide and 0% mercaptan. The hydrocarbon mixture was evaporated on a steam bath. The oil residue weighed 9.8 grams. This material was free of mercaptans and a qualitative analysis revealed an alcoholic functional group and sulfur thus— RS—CH$_2$—CH$_2$—OH.

Example X

A concentrate of ethylene oxide-mercaptan reaction product in gasoline as produced in Example IV was distilled to remove the hydrocarbon and fractionated to separate a fraction boiling at 530° F. It was found to be substantially pure monoethanol meta tolyl sulfide having the following structure:

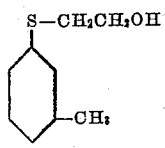

It was added to the same catalytically cracked gasoline in quantity of 0.1 weight percent as in Example VI and found to impart an induction period thereto of 4½ hours.

It will be appreciated that the present invention has many applications flowing from the fact that phenols selectively catalyzed the reaction of epoxides with mercaptan. Thus many gasoline sweetening procedures may be used with this catalysis to allow sweetening with great economy. Crude phenols themselves are readily purified of mercaptan content by selective reaction with epoxide. Spent caustic solutions containing acid oils contaminated with mercaptan are readily regenerated to remove the mercaptan. That spent caustic most efficiently contains at least about 5 vol. percent of phenols, but lesser quantities such as 1% provide some, but less efficient catalysis. Similarly the phenol in acid form provides substantial catalytic activity, but are most effective in substantially alkaline solution containing at least 5% alkali. The reaction may be applied to form various epoxy-mercapto derivatives using mercaptan other than available by extraction from petroleum.

Accordingly, it is intended that the examples and illustrations of flow arrangement for handling of gasoline in the sweetening thereof and regeneration of spent caustic solutions be regarded as illustrative and not limiting except as defined in the claims appended hereto.

This application is a division of my co-pending application Serial No. 565,289, filed December 21, 1955 now Patent No. 2,862,804.

I claim:

1. The process of regenerating spent aqueous caustic soda solution containing alkali metal phenolates and alkali metal mercaptides, the quantity of alkali phenolates being at least 5% by weight, comprising dissolving an organic epoxide in a liquid hydrocarbon solvent and selectively reacting by intimately contacting the solvent solution of epoxide with the said spent caustic solution to form a substantially aqueous mercaptan-free solution of caustic soda and phenolic oils and a water immiscible solvent solution of epoxide-mercaptan reaction product and separating the solutions.

2. The process of regenerating spent aqueous caustic soda solution used in the refining of mercaptan containing petroleum liquid and containing acid oils comprising alkali phenolates in quantity of at least 5% by weight and mercaptides extracted from said petroleum liquid, said process comprising extracting the mercaptide by selective reaction of said spent caustic soda solution with organic epoxide dissolved in a hydrocarbon solvent by contacting the said spent caustic and hydrocarbon epoxide solutions, separating the mercaptan-free alkali phenolate solution from the solution of epoxide-mercaptan reaction product dissolved in the hydrocarbon solvent and acidifying the caustic solution to recover the phenols.

3. The process of regenerating spent aqueous caustic soda solution containing acid oils comprising alkali phenolates in quantity of at least 5% by weight and mercaptides said process comprising extracting the mercaptide by selective reaction thereof with organic epoxide dissolved in a hydrocarbon solvent by contacting the said spent caustic and hydrocarbon epoxide solution, separating the hydrocarbon solution of epoxide-mercaptan reaction product and purifying the same by fractional distillation.

4. The process of regenerating spent aqueous caustic soda solution as defined in claim 1 wherein the epoxide is a lower aliphatic epoxide.

References Cited in the file of this patent

UNITED STATES PATENTS

| | | |
|---|---|---|
| 2,530,561 | Arnold et al. | Nov. 21, 1950 |
| 2,771,404 | Jezl et al. | Nov. 20, 1956 |
| 2,794,768 | Brooks | June 4, 1957 |